(12) United States Patent
Sugita et al.

(10) Patent No.: US 8,861,359 B2
(45) Date of Patent: Oct. 14, 2014

(54) NETWORK SYSTEM, CONTROL METHOD THEREOF AND CONTROLLER

(75) Inventors: Takahide Sugita, Tokyo (JP); Hiroshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/200,749

(22) Filed: Sep. 30, 2011

(65) Prior Publication Data

US 2012/0075991 A1 Mar. 29, 2012

Related U.S. Application Data

(63) Continuation of application No. PCT/JP2010/072333, filed on Dec. 13, 2010.

(30) Foreign Application Priority Data

Dec. 15, 2009 (JP) ................................. 2009-284019

(51) Int. Cl.
| | |
|---|---|
| H04L 12/28 | (2006.01) |
| G06F 15/16 | (2006.01) |
| G06F 15/173 | (2006.01) |
| H04L 12/931 | (2013.01) |
| G06F 9/50 | (2006.01) |
| H04L 12/24 | (2006.01) |
| H04L 12/707 | (2013.01) |

(52) U.S. Cl.
CPC .............. *H04L 12/24* (2013.01); *H04L 49/356* (2013.01); *G06F 9/505* (2013.01); *H04L 41/00* (2013.01); *H04L 45/24* (2013.01); *H04L 49/70* (2013.01)
USPC .................. 370/235; 370/395.21; 370/395.41; 370/401; 709/203; 709/226; 709/238; 709/249

(58) Field of Classification Search
CPC . H04L 12/66; H04L 12/5693; H04L 12/5695; H04L 29/06; H04L 29/0809; H04L 29/06027; H04L 29/06047; H04L 29/06068; H04L 29/08072; H04L 29/08144; H04L 29/08171; H04L 29/12009; H04L 45/00; H04L 47/10; H04L 47/30; H04L 47/32; H04L 47/805; H04L 47/2441; H04L 47/6225; H04L 49/351; H04L 2012/5679; H04Q 11/0478; G06Q 30/02

USPC ........ 370/235, 395.21, 395.41, 401; 709/203, 709/226, 238, 249
See application file for complete search history.

(56) References Cited

U.S. PATENT DOCUMENTS

| | | | |
|---|---|---|---|
| 6,898,416 B2 | 5/2005 | Saarinen et al. | |
| 7,142,512 B1 | 11/2006 | Kobayashi et al. | |
| 2002/0049608 A1* | 4/2002 | Hartsell et al. ..................... | 705/1 |
| 2005/0022185 A1* | 1/2005 | Romero ......................... | 718/100 |

(Continued)

FOREIGN PATENT DOCUMENTS

| | | |
|---|---|---|
| JP | 2002-016599 A | 1/2002 |
| JP | 2002-543721 A | 12/2002 |
| JP | 2006-211661 A | 8/2006 |

OTHER PUBLICATIONS

International Search Report—FormPCT/ISA/210 dated Jan. 25, 2011.

(Continued)

*Primary Examiner* — Alpus H Hsu
*Assistant Examiner* — Dharmesh Patel
(74) *Attorney, Agent, or Firm* — McGinn IP Law Group, PLLC

(57) ABSTRACT

A network system includes a server which accommodates a plurality of tenants, at least one network appliance which has a resource shared by the plurality of tenants, a plurality of switches arranged between the at least one network appliance and a network; and a controller which controls the switches. Each switch has a flow table indicating an association of an input source with a transfer destination of packets for each flow, and transfers packets received from the input source to the transfer destination by referring to the flow table. The controller includes an assignment control block which dynamically assigns each of a plurality of tenants to any of the at least one network appliance; a route design block which designs a flow route for each of the tenants; and a switch setting block which sets the flow table for each of switches along the designed route.

20 Claims, 15 Drawing Sheets

(56) References Cited

U.S. PATENT DOCUMENTS

| | | | |
|---|---|---|---|
| 2005/0188073 A1* | 8/2005 | Nakamichi et al. | 709/223 |
| 2006/0015354 A1* | 1/2006 | Shrum et al. | 705/1 |
| 2006/0168279 A1 | 7/2006 | Lee et al. | |
| 2008/0239985 A1* | 10/2008 | Karve et al. | 370/254 |
| 2010/0115095 A1* | 5/2010 | Zhu et al. | 709/226 |

OTHER PUBLICATIONS

Hiroshi Ueno et al, "A study on Deployment of Network Appliance Functionalities in Datacenter Network", IEICE Technical Report, CPSY2009-36, Nov. 13, 2009, vol. 109, No. 296, pp. 7-12.

Shohei Yoshimoto, et al, "Network Virtualizaion for Optimizing System infrastructure", Giho UNISYS Technology Review, Nov. 30, 2009, vol. 29, No. 3, pp. 39-53.

"Cisco Application Control Engine: a Technical Overview of Virtual Partitioning" (http://www.cisco.com/en/US/prod/collateral/modules/ps2706/ps6906/White_Paper_Cisco_Application_Control_Engin_A_Technical_Overview_of_Virtual_Partitioning_pg7027_Products_White_Paper.html).

* cited by examiner

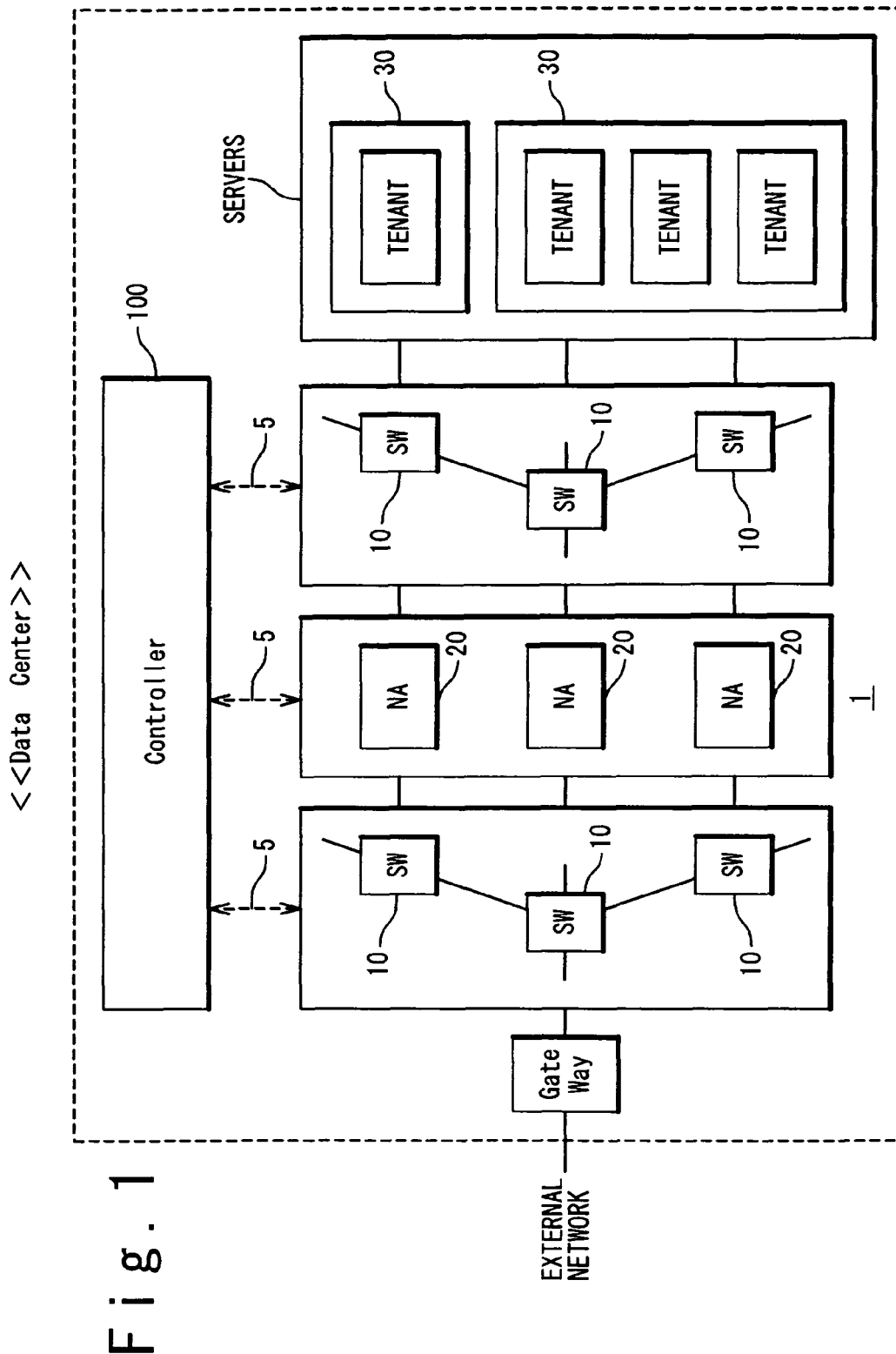

Fig. 4

14:FLOW TABLE

| INPUT PORT | Header | OUTPUT PORT | Action |
|---|---|---|---|
|  |  |  |  |
|  |  |  |  |
|  |  |  |  |
|  |  |  |  |

Fig. 6

APL: APPLIANCE INFORMATION

| NETWORK APPLIANCE | RESOURCE CAPACITY | |
| --- | --- | --- |
| | TRAFFIC TRANSFER RATE | ... |
| NA1 | 1000 Mbps | |
| NA2 | 1000 Mbps | |
| ⋮ | ⋮ | |

Fig. 7

TNT:TENANT

| TENANT | VIRTUAL IP ADDRESS | REAL IP ADDRESS | ACTIVE FLAG | RESOURCE CAPACITY | |
|---|---|---|---|---|---|
| | | | | TRAFFIC TRANSFER RATE | ... |
| TN1 | 10.10.10.1 | 192.168.0.1<br>192.168.0.2 | ✓ | 600 Mbps | |
| TN2 | 10.10.10.2 | 192.168.0.3 | ✓ | 100 Mbps | |
| ... | ... | ... | ... | ... | ... |

Fig. 8

ASN:ASSIGNMENT INFORMATION

| NETWORK APPLIANCE | TENANT |
|---|---|
| NA1 | TN11, TN12, ⋯ |
| NA2 | TN21, TN22, ⋯ |
| ⋮ | ⋮ |

US 8,861,359 B2

NETWORK SYSTEM, CONTROL METHOD THEREOF AND CONTROLLER

CROSS-REFERENCE TO RELATED APPLICATION

This is a continuation of International Application No. PCT/JP2010/072333, filed on Dec. 13, 2010.

BACKGROUND OF THE INVENTION

1. Field of the Invention

The present invention relates to a network system and a control method thereof. More particularly, the present invention relates to a technique for sharing a resource of a network appliance in a network system.

2. Description of the Related Art

In recent years, the demand for data centers has been steadily increasing. In general, a data center accommodates a plurality of tenants. The "tenant" refers to a unit to identify a user who uses a service and a function provided by the provider, as well as a unit to identify an application provided by the provider. Here, the provider refers to an entity that operates and manages the servers.

Typically a physical system including a server and a network appliance is constructed for each tenant in a data centers. The network appliance is a network device for executing a specific process for the network traffic, such as firewalls and load balancers. When a virtualization technique is used, on the other hand, one physical system can be shared by a plurality of tenants. In this case, it would be advantageous for the data center provider that a plurality of tenants can be accommodated efficiently without suffering from physical restrictions.

For example, use of a virtualization technique disclosed in a non-patent document entitled, "Cisco Application Control Engine: a Technical Overview of Virtual Partitioning" allows distributing resources of one network appliance, and assigns the distributed resources to the respective tenants. Here, the "resource" means to include the traffic transfer performance, the connection process performance and the number of simultaneous connections or the like. For example, when one network appliance has a traffic transfer performance of 1 Gbps, it is possible to preliminarily assign 600 Mbps to a tenant A and 400 Mbps to another tenant B. In this case, costs spent for constructing and administering the system can be reduced, compared to a case in which network appliances are prepared for respective tenants.

It should be noted that Japanese Patent Application Publication No. P2002-16599 A and Japanese Translation of PCT application No. P2002-543721 A are known as other techniques related to the network system.

Japanese Patent Application Publication No. P2002-16599A discloses a network measurement control system. A meter measures network traffic and the measurement data are transferred to a control server. The control server holds a policy for controlling assurance of communication service quality or the like. The control server analyzes the measurement data collected from the meter and transmits control instructions according to the policy to a router. The router provides a control in accordance with the control instructions. This enables ensuring a fine communication service quality adapted to the network circumstance.

Japanese Translation of PCT application No. P2002-543721A discloses a device which measures a usage of system resources in a communication network. The device includes means for measuring which radio resources are used by a transmission in a system, means for measuring which data service units are used for the transmission in the system, and means for measuring which transmission characteristics are used by the transmission in the system. All of these determination means are adapted for a respective collective measurement.

SUMMARY OF INVENTION

In the technique disclosed in the above-described non patent document, it is an indispensable requisite that the network appliances support virtualization; however, a network appliance which does not support virtualization may be used. Moreover, when a large number of tenants exist, it is not necessarily efficient from an aspect of performance to share resources in advance by the large number of tenants, even if the network appliances support virtualization. It would be desirable that resources of the network appliances are efficiently shared by a plurality of tenants even in these cases.

One object of the present invention is to provide a technique in which a resource of a network appliance can be shared by a plurality of tenants.

In one aspect of the present invention, a network system is provided. The network system includes a server which accommodates a plurality of tenants, one or more network appliances which have a resource shared by the plurality of tenants, a plurality of switches arranged between the network appliances and a network; and a controller which controls the plurality of the switches. Each of the switches has a flow table indicating an association of an input source with a transfer destination of packets for each flow, and transfers packets received from the input source to the transfer destination by referring to the flow table.

The controller includes an assignment block, a route design block and a switch setting block. The assignment control block carries out a dynamic assignment process for dynamically assigning each of a plurality of tenants to any of the one or more network appliances. The route design block designs a flow route for each of the tenants so as to pass through the assigned network appliance. The switch setting block sets the flow table for each of switches along the designed route so that packets which belong to a flow related to each of tenants is transferred along the designed route.

In another aspect of the present invention, a controller used in a network system is provided. The network system includes a server which accommodates a plurality of tenants, one or more network appliances which have a resource shared by the plurality of tenants and a plurality of switches arranged between the network appliances and a network. Each of the plurality of the switches having a flow table indicating an association of an input source with a transfer destination of packets for each flow and transferring packets received from the input source to the transfer destination by referring to the flow table.

The controller includes an assignment block, a route design block and a switch setting block. The assignment control block carries out a dynamic assignment process for dynamically assigning each of a plurality of tenants to any of the one or more network appliances. The route design block designs a flow route for each of the tenants so as to pass through the assigned network appliance. The switch setting block sets the flow table for each of switches along the designed route so that packets which belong to a flow related to each of tenants is transferred along the designed route.

In still another aspect of the present invention, a method for controlling a network system is provided. The network system includes a server which accommodates a plurality of tenants, one or more network appliances which have a resource shared by the plurality of tenants and a plurality of switches arranged between the at least one network appliance and a network. Each of the plurality of the switches having a flow table indicating an association of an input source with a transfer destination of packets for each flow and transferring packets received from the input source to the transfer destination by referring to the flow table.

The control method according to the present invention includes: (A) carrying out a dynamic assignment process for dynamically assigning each of plurality of tenants to any of the one or more network appliances; (B) designing a flow route for each of the tenants so as to pass through the assigned network appliance; and (C) setting the flow table for each of switches along the designed route so that packets which belong to a flow related to each of tenants is transferred along the designed route.

In still another aspect of the present invention, a control program is provided which causes a computer to execute a control process of a network system. The network system includes a server which accommodates a plurality of tenants, one or more network appliances which have a resource shared by the plurality of tenants and a plurality of switches arranged between the at least one network appliance and a network. Each of the plurality of the switches having a flow table indicating an association of an input source with a transfer destination of packets for each flow and transferring packets received from the input source to the transfer destination by referring to the flow table.

The control process according to the present invention includes: (A) carrying out a dynamic assignment process for dynamically assigning each of a plurality of tenants to any of the one or more network appliances; (B) designing a flow route for each of the tenants so as to pass through the assigned network appliance; and (C) setting the flow table for each of switches along the designed route so that packets which belong to a flow related to each of tenants is transferred along the designed route.

According to the present invention, a resource of a network appliance can be shared by a plurality of tenants.

BRIEF DESCRIPTION OF THE DRAWINGS

The above and other objects, advantages and characteristics will be more clarified by an embodiment of the present invention explained along with following drawings.

FIG. 1 is a block diagram showing a configuration example of a network system according to one embodiment of the present invention;

FIG. 4 is a conceptual diagram showing a flow table of the switch in the present embodiment;

FIG. 6 is a conceptual diagram showing appliance information in the present embodiment;

FIG. 7 is a conceptual diagram showing tenant information in the present embodiment;

FIG. 8 is a conceptual diagram showing assignment information in the present embodiment;

DESCRIPTION OF PREFERRED EMBODIMENTS

Figure 2A:
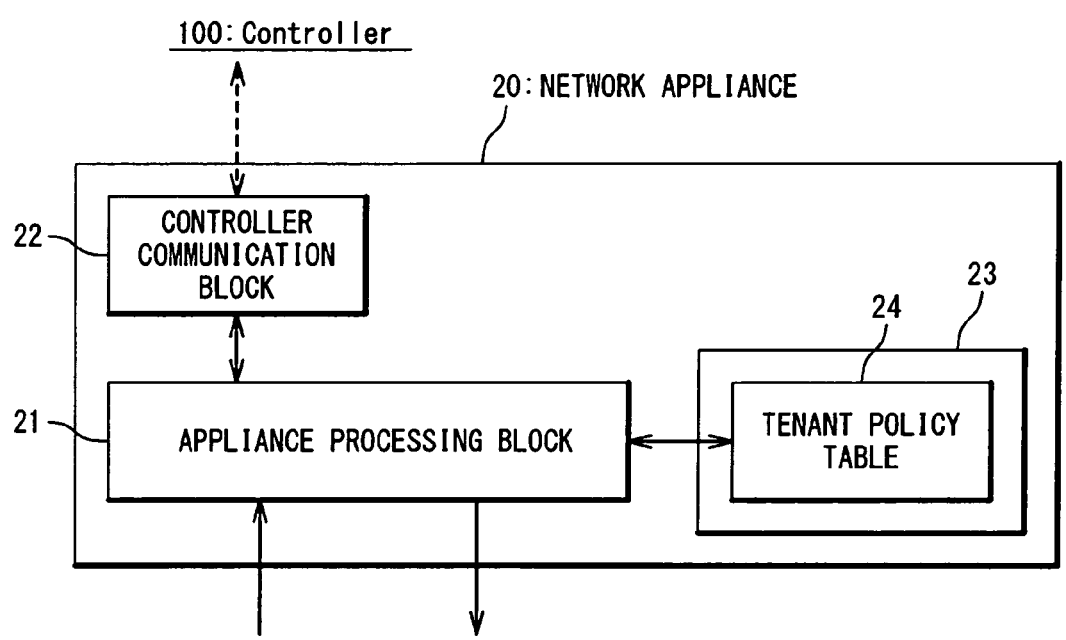
FIG. 2A is a block diagram showing an example of the configuration of a network appliance in the present embodiment.

Referring to the accompanying drawings, embodiments of the present invention will be explained.

1. Network System

FIG. 1 is a block diagram showing a configuration example of a network system 1 according to one embodiment. The network system 1 is provided with switch networks, a network appliance group, a server group and a controller 100.

The server group includes one or more servers 30. The servers 30 may be physical servers and may also be virtual servers.

The network appliance group includes at least one network appliance 20, and is arranged on the previous side of the server group. The network appliances 20 are network devices which execute a specific process for network traffic. Examples of the network appliances 20 include a firewall, a load balancer, a spam detector, an intrusion detector, an encryption acceleration device and a codec converting process.

The switch networks each include a plurality of switches 10 connected to each other. One switch network is arranged on the previous side of the network appliance group. In other words, the switch network is arranged between an external network and the network appliance group. The other switch network is provided between the network appliance group and the server group.

The controller 100 is connected to each of the switches 10 via a control line 5. The controller 100 receives information from each of the switches 10 and controls each of the switches 10. The controller 100 is further connected to each of the network appliances 20 via a control line 5. Via the control line 5, the controller 100 receives information from each of the network appliances 20 and also controls each of the network appliances 20.

The network system 1 according to the present embodiment is applied to a data center. As shown in FIG. 1, the network system 1 provided in the data center is connected to an external network via a gateway.

The server group of the data center accommodates a plurality of tenants. The "tenant" refers to a unit for identifying users who use services and functions provided by the provider as well as a unit for identifying applications provided by the provider. Here, the provider is an entity that operates and manages the servers. One tenant may be accommodated in one physical server. Alternatively, one physical server may accommodate a plurality of tenants, when a plurality of virtual servers are run on the physical server.

As will be explained later in detail, the tenants are each "dynamically" assigned to any one of the network appliances 20 in the present embodiment; such a process is referred to as dynamic assignment process. In other words, the assignment relation between the tenants and the network appliances 20 is changed appropriately depending on circumstances. Each network appliance 20 performs a predetermined process (such as, a process as a load balancer and a process as a firewall) for flows of tenants assigned to the network appliance 20. Here, a plurality of tenants may be simultaneously assigned to one network appliance 20. In this case, a "resource" of the one network appliance 20 is shared by the plurality of the tenants. Here, the "resource" refers to a traffic transfer performance, a connection process performance and the number of simultaneous connections or the like.

FIG. 2A is a block diagram showing an example of the configuration of a network appliance 20. The network appliance 20 is provided with an appliance processing block 21, a controller communication block 22 and a storage block 23. The storage block 23 stores a tenant policy table 24. The tenant policy table 24 indicates a policy and a rule for each of the tenants which are assigned to the network appliance 20. The appliance processing block 21 refers to the tenant policy table 24 and performs a predetermined process (such as, a process as a load balancer and a process as a firewall) for flows of the tenants assigned to the network appliance 20. The controller communication block 22 has the function of communicating with the controller 100 via the control line 5.

Figure 2B:
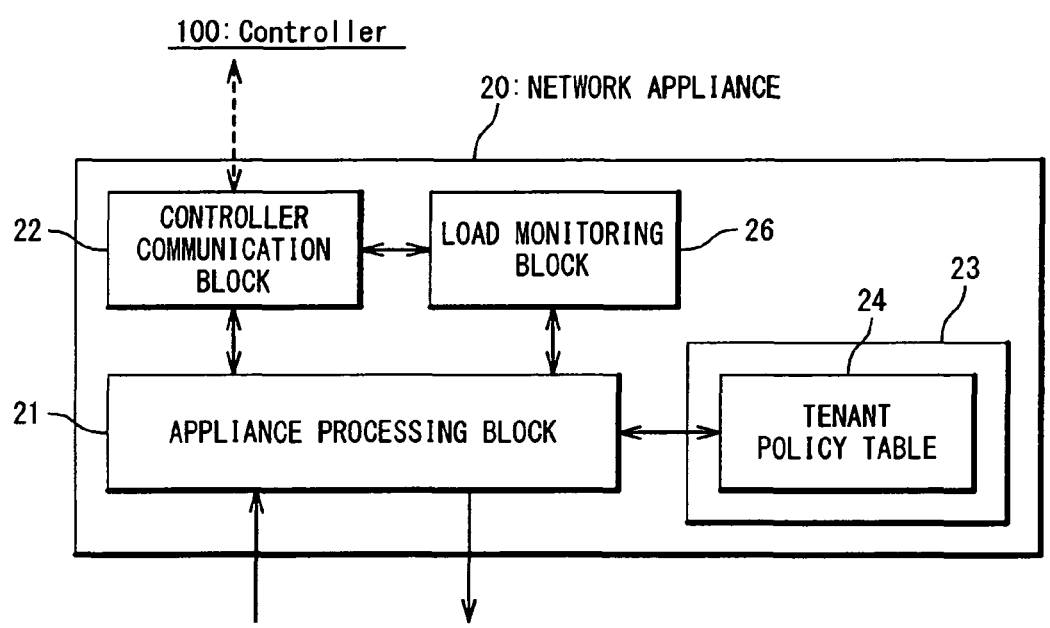
FIG. 2B is a block diagram showing another example of the configuration of the network appliance in the present embodiment.

FIG. 2B is a block diagram showing another example of the configuration of a network appliance 20. In comparison with FIG. 2A, the network appliance 20 further includes a load monitoring block 26. The load monitoring block 26 measures the amount of each resource used by each tenant. The "used resource amount" refers to the amount of a resource (e.g. traffic transfer amount) of the network appliance 20 which is actually used. The load monitoring block 26 may also measure the total sum of the used resource amounts of the respective tenants or the used resource amounts (or the process load) of the entire network appliances 20. The load monitoring block 26 periodically notifies the controller 100 of measurement information which indicates the measured used resource amounts.

Figure 3A:
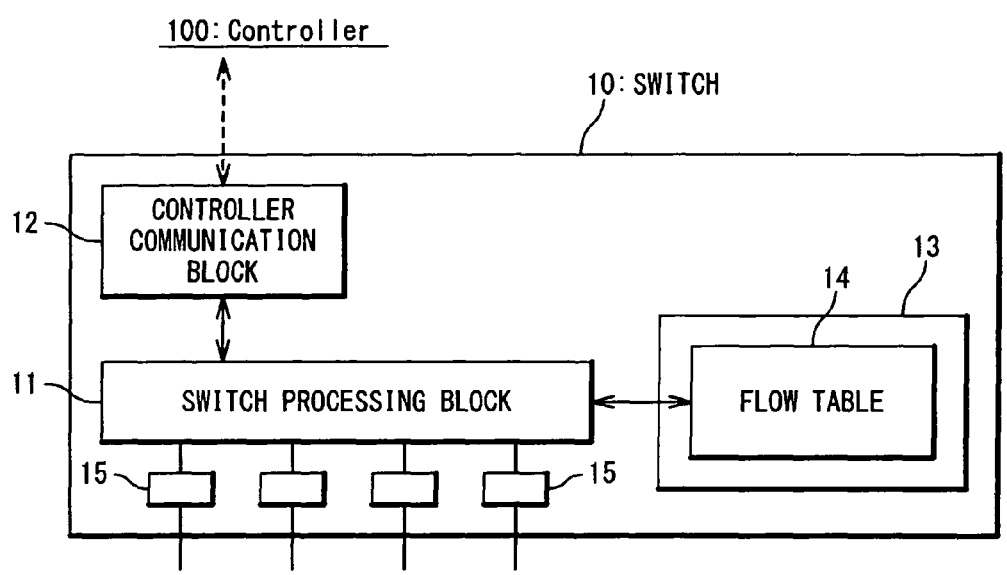
FIG. 3A is a block diagram showing an example of the configuration of a switch in the present embodiment.

FIG. 3A is a block diagram showing an example of the configuration of a switch 10. The switch 10 is provided with a switch processing block 11, a controller communication block 12, a storage block 13 and a plurality of ports 15. The ports 15 which receive packets sent from the outside serve as input ports and the ports 15 which output packets to the outside serve as output ports. The switch processing block 11 carries out main switch processes such as packet transfer from an input port to an output port. The controller communication block 12 has the function of communicating with the controller 100 via the control line 5.

The storage block 13 stores a flow table (or transfer table) 14. The flow table 14 indicates an association of an input source (or input port) with a transfer destination (or output port) of packets for each flow. The switch processing block 11 can transfer a packet received from an input port to an output port as instructed by referring to the flow table 14 stored in the storage block 13. More details are given in the following.

FIG. 4 is a conceptual diagram showing the flow table 14. The flow table 14 contains different entries for the flows. Each entry indicates the association among an input port, header information, an output port and an action. The header information is information obtained from a packet header, such as a destination MAC address, a transmission source MAC address, a destination IP address, and a transmission source IP address. Each flow can be identified with the header information. The action means the contents of processing (such as transfer and deletion) to be performed on a received packet.

When a packet is received via an input port, the switch processing block 11 extracts header information of the received packet. The switch processing block 11 then searches the flow table 14 by using the extracted header information and the input port as a search key. If there is an entry which matches the search key, the switch processing block 11 performs the action indicated by the entry. Typically, the switch processing block 11 outputs the received packet to the output port indicated by the entry.

Figure 3B:
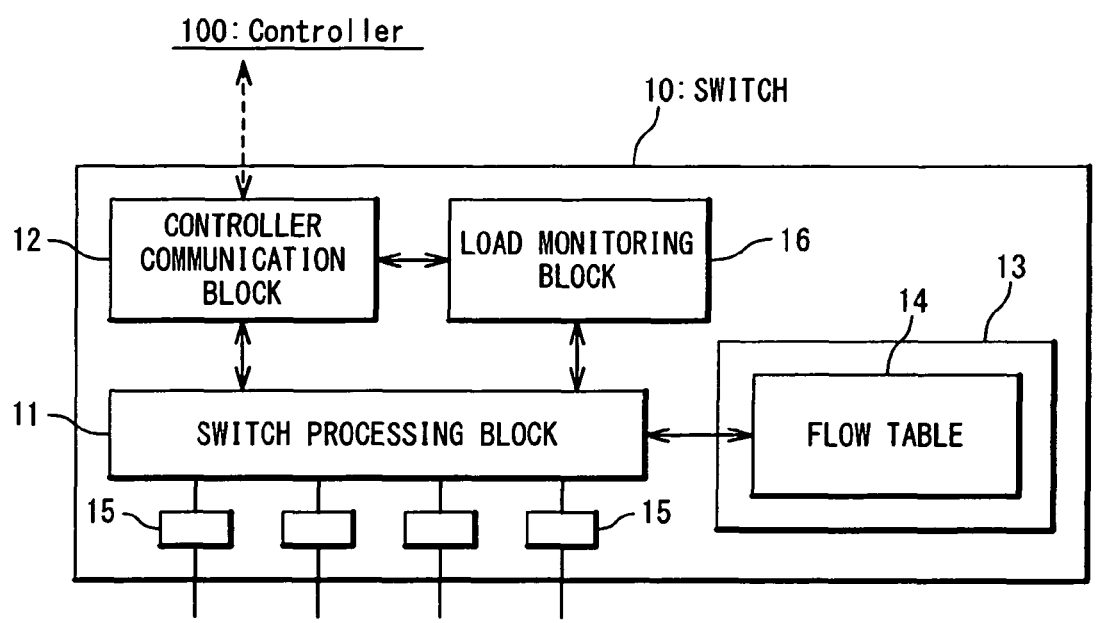
FIG. 3B is a block diagram showing another example of the configuration of the switch in the present embodiment.

FIG. 3B is a block diagram showing another example of the configuration of a switch 10. In comparison with FIG. 3A, the switch 10 further includes a load monitoring block 16. The load monitoring block 16 measures the used resource amounts (e.g. traffic transfer amount) for each flow (or tenant). The load monitoring block 16 periodically notifies the controller 100 of measurement information which indicates the measured used resource amounts.

Regarding a flow of a certain tenant, the route of the flow (or the packet transfer route) is designed by the controller 100 within the network system 1. The controller 100 then controls the respective switches 10 along the designed route so that flow communications are achieved along the designed route. Each of the switches 10 along the designed route sets its own flow table 14 and the like in accordance with instructions sent from the controller 100. The interface method between the controller 100 and the switches 10 in order to realize such a process may be Openflow, for example. In this case, an "openflow controller" serves as the controller 100 and "openflow switches" serve as the switches 10. The use of "Source Channel" of Openflow enables setting the flow table 14 in each of the switches 10.

According to the present embodiment, the controller 100 determines the assignment relation between the tenants and the respective network appliances 20, and also changes the assignment relation dynamically depending on circumstances. In addition, the controller 100 controls the respective switches 10 so as to realize the assignment relation. That is, the controller 100 dynamically controls the usage states of the network appliances 20 by controlling the switches 10 without causing the network appliances 20 to be conscious of the control in the present embodiment. This allows sharing resources of the relevant network appliances 20 by a plurality of tenants without causing the network appliances 20 to be conscious of the sharing.

2. Controller

Figure 5:
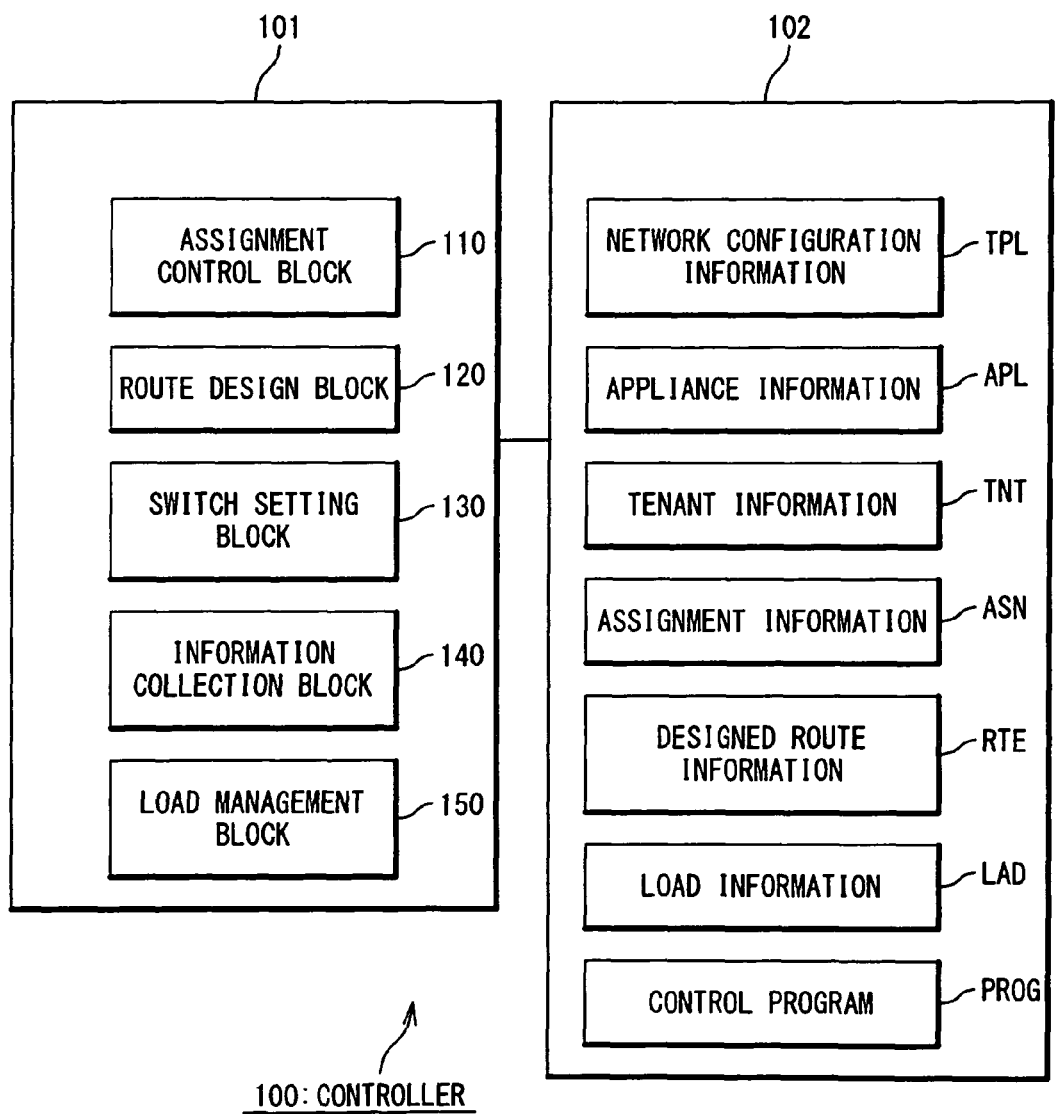
FIG. 5 is a block diagram showing the configuration of a controller according to the present embodiment.

A detailed description is given below of the controller 100 according to the present embodiment. FIG. 5 is a block diagram showing a configuration of the controller 100 according to the present embodiment. The controller 100 includes a processor 101 and a storage unit 102. The processor 101 includes a CPU (Central Processing Unit). The storage unit 102 includes a RAM (Random Access Memory) and an HDD (Hard Disk Drive).

The storage unit 102 stores network configuration information TPL, appliance information APL, tenant information TNT, assignment information ASN, designed route information RTE, and load information LAD and the like.

The network configuration information TPL indicates the physical and logical configuration of the network system 1. That is, the network configuration information TPL indicates connections (or the topology) among the component elements, such as the switches 10, the network appliances 20 and the servers 30. For example, the network configuration information TPL indicates which port 15 of which switch 10 the servers 30 are each connected to, and which port 15 of which switch 10 the network appliances 20 are each connected to, and the like.

The appliance information APL indicates a resource capacity of each of the network appliances 20. The "resource capacity" refers to the total amount of resources owned by one network appliance 20. FIG. 6 shows an example of the appliance information APL. In the example of FIG. 6, the appliance information APL indicates identification information (such as NA1, NA2 . . . ) of the network appliances 20 and the response capacities (e.g. the allowed maximum value of the traffic transfer amount) thereof.

The tenant information TNT is information regarding each of a plurality of tenants. FIG. 7 shows an example of the tenant information TNT. As show in FIG. 7, the tenant information TNT has an entry for each tenant. Each entry includes the identifier (such as TN1, TN2 . . . ) of the relevant tenant, the virtual IP address and the real IP address of the server 30 in which the relevant tenant is accommodated, an active flag and a resource condition. The active flag is information indicating whether or not the relevant tenant is active. The "resource condition" refers to the resource amounts (e.g. traffic transfer amount) of the network appliances 20 which are allowed to use for the relevant tenant.

The assignment information ASN indicates the assignment relation between the tenants and the network appliances 20. FIG. 8 shows an example of the assignment information ASN. Each tenant is assigned to any of the network appliances 20. A plurality of tenants may be assigned to one network appliance 20 simultaneously. In this case, a resource of the one network appliance 20 is shared by the plurality of the tenants.

The designed route information RTE indicates the packet transfer route within the network system 1 for each flow (or tenant). As will be described later, the packet transfer route is designed by the controller 100.

The load information LAD indicates the amounts of resources used by each tenant and the amounts of used resources (or process load) in each of the network appliances 20. It should be noted that that these used resource amounts are measured by "monitoring means" provided in the network system 1. The monitoring means are the load monitoring block 26 (refer to FIG. 2B) in the network appliance 20 and/or the load monitoring block 16 (refer to FIG. 3B) in the switch 10.

Furthermore, the storage unit 102 contains a control program PROG. The control program FROG is a computer program which causes the processor 101 to execute a network control process according to the present embodiment. The control program PROG may be recorded in a recording medium which is readable by computer. The processor 101 realizes a network control process according to the present embodiment by executing the control program PROG. More specifically, as show in FIG. 5, the processor 101 includes an assignment control block 110, a route design block 120, a switch setting block 130, an information collection block 140, and a load management block 150. These function blocks are cooperatively realized by the processor 101 and the program PROG.

The controller 100 as configured above executes a network control process according to the present embodiment. As will be explained below, the network control process includes a new assignment process (i.e. step S110), a dynamic change process (i.e. step S120) and an assignment canceling process (i.e. step S130).

3. Process Flow 3-1. New Assignment Process

Figure 9:
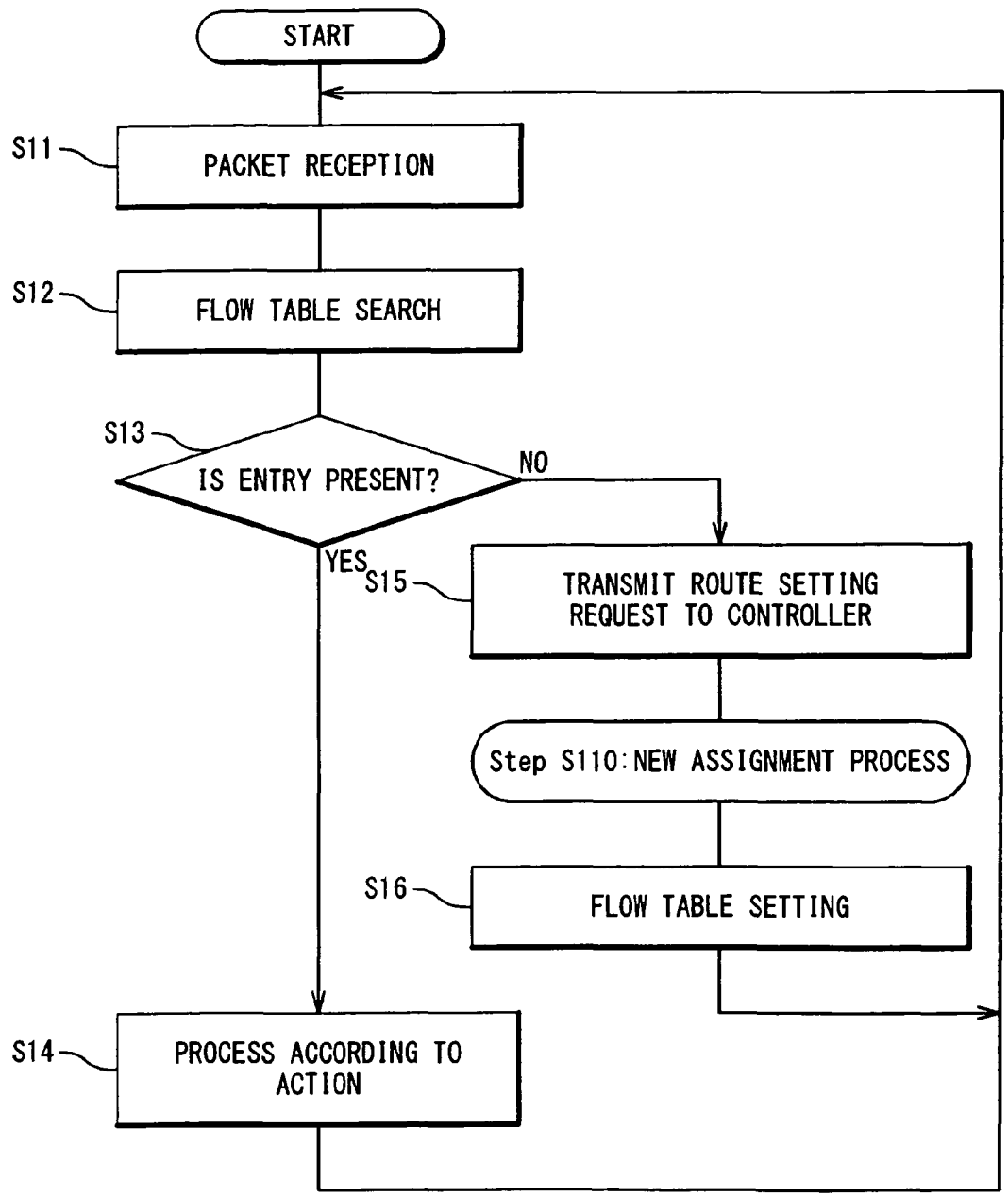
FIG. 9 is a flowchart showing a process carried out by the switch in the present embodiment.

FIG. 9 is a flowchart showing the process carried out by each switch 10 (refer to FIG. 3A or FIG. 3B) in the present embodiment. The switch 10 receives a packet of a certain flow (Step S11). More specifically, the switch processing block 11 receives a packet through an input port. Upon the reception of the packet from the input port, the switch processing block 11 extracts header information of the received packet. The switch processing block 11 then searches the flow table 14 by using the extracted header information and the input port as a search key (step S12). If there is an entry which matches the search key (step S13; Yes), the switch processing block 11 performs the action indicated by the entry (step S14). Typically, the switch processing block 11 outputs the received packet to the output port indicated by the entry.

When the flow table 14 include no entry which matches the search key (step S13; No), this means the switch 10 receives the first packet of the flow. In this case, the switch processing block 11 requests the controller 100 to set the transfer route of the packets of the flow. More specifically, the switch processing block 11 transmits a route setting request (the received packet or the header information of the received packet) to the controller 100 (step S15) via the controller communication block 12. The switch 10 which transmits the route setting request to the controller 100 is referred to as "request source switch", hereinafter.

Figure 10:
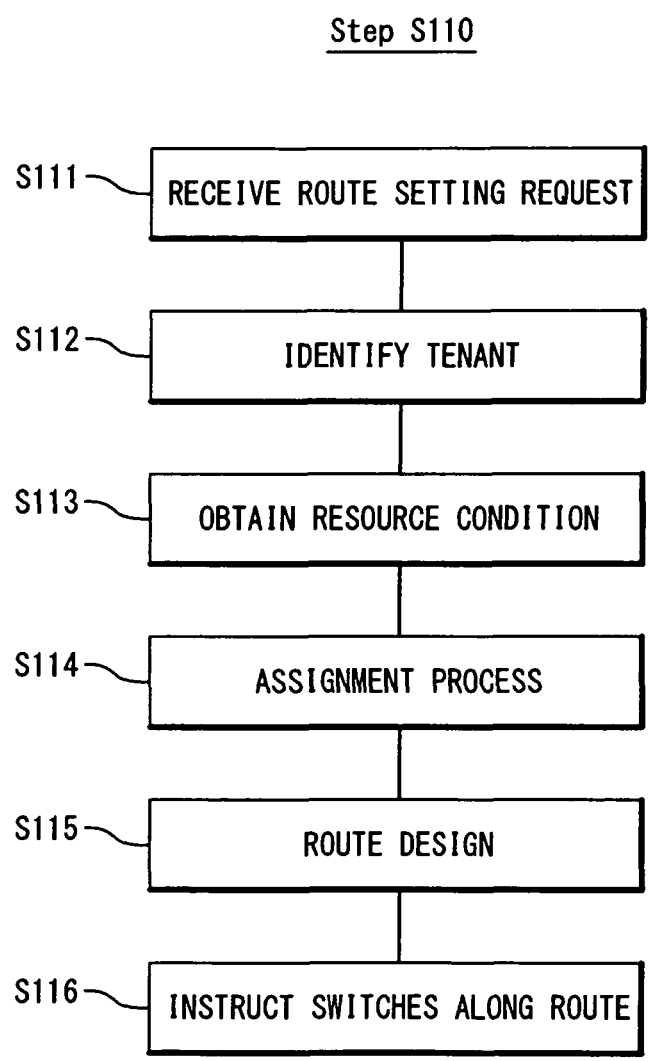
FIG. 10 is a flowchart showing a new assignment process (i.e. step S110) in the present embodiment.

When the route setting request is received from the request source switch, the controller 100 performs a new assignment process (i.e. step S110). FIG. 10 is a flowchart showing the step S110.

Step S111:
The assignment control block 110 of the controller 100 receives the route setting request (or the received packet or the header information of the received packet) from the request source switch.

Step S112:
The assignment control block 110 extracts the destination address of the flow from the header information of the received packet which is included in the route setting request. Furthermore, the assignment control block 110 refers to the tenant information TNT (refer to FIG. 7) stored in the storage unit 102 and specifies the tenant associated with the destination address. The assignment control block 110 then sets the active flag of the entry of the specified tenant to "active".

Step S113:
The assignment control block 110 also refers to the tenant information TNT stored in the storage unit 102 and obtains the "resource condition" of the specified tenant.

Step S114:
Subsequently, the assignment control block 110 assigns the specified tenant to any of the network appliances 20. At this time, the assignment control block 110 determines the network appliance 20 to which the tenant is assigned by referring to the appliance information APL (refer to FIG. 6), the tenant information TNT (refer to FIG. 7) and the assignment information ASN (refer to FIG. 8) which are stored in the storage unit 102. More specifically, the assignment control block 110 determines the assignment relation between the network appliances 20 and the tenant so that "the total sum of resource conditions of the assigned tenant" does not exceed the "resource capacity". It should be noted that the determination and change of the assignment relation between the network appliances 20 and the tenant by the assignment control block 110 are referred to as "dynamic assignment process", hereinafter.

When the network appliance 20 to which the tenant is assigned is determined, the assignment control block 110 updates the assignment information ASN. The assignment control block 110 also adds an entry of the assigned tenant to the tenant policy table 24 of the network appliance 20.

Step S115:
The route design block 120 of the controller 100 refers to the network configuration information TPL stored in the storage unit 102 and designs the route of the flow from the request source switch to the destination address (i.e. the packet transfer route). At this time, the route design block 120 designs the route of the flow so as to pass through the network appliance 20 determined in the above step S114. That is, the route design block 120 designs the flow route of each tenant so as to pass through the network appliance 20 assigned to each tenant. The route design block 120 generates the designed route information RTE which indicates the designed route and stores the designed route information RTE in the storage unit 102.

Step S116:

The switch setting block 130 of the controller 100 refers to the designed route information RTE stored in the storage unit 102. The switch setting block 130 then issues instructions to each of the switches (including the request source switch) along the designed route via the control line 5. More specifically, the switch setting block 130 instructs each of the switches 10 along the designed route to set the flow table 14 so that packets of the flow of the relevant tenant are transferred along the designed route.

The switch setting block 130 may also set an upper limit value of the traffic transfer amount for each of the switches 10. More specifically, the switch setting block 130 may refer to the tenant information TNT (refer to FIG. 7) and instruct each of the switches 10 to control the traffic transfer amount so that each tenant has a traffic transfer amount within the "resource condition".

Each of the switches 10 along the designed route carries out step S16 (refer to FIG. 9). More specifically, each of the switches 10 along the designed route adds an entry related to the flow to its own flow table 14 in accordance with the instructions sent from the controller 100. Thereafter, the controller 100 returns the received packet to the request source switch. From then on, when a packet of the relevant flow is received, each of the switches 10 along the designed route can transfer the packet along the specified route. Each of the switches 10 may also control the traffic transfer amount in accordance with the instructions sent from the controller 100 so that the traffic transfer amount each tenant ranges within the resource condition.

3-2. Dynamic Control Process

According to the present embodiment, the resource usage state in the network appliance 20 can be controlled "dynamically". In order to achieve this, the load state is monitored within the network system 1.

Figure 11:
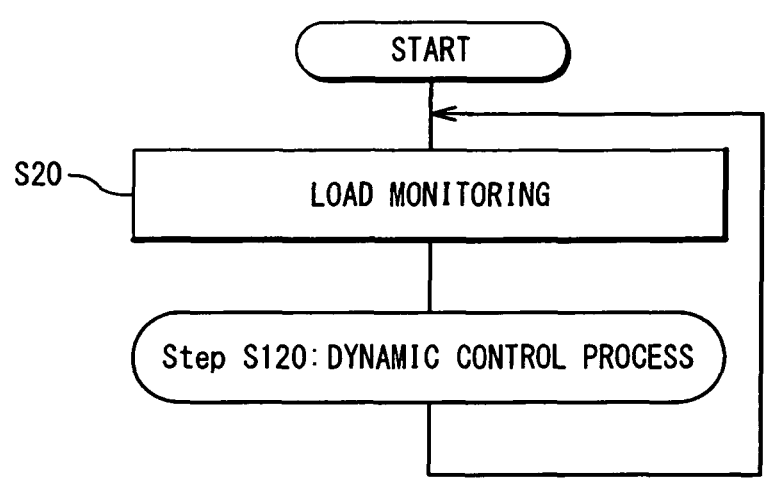
FIG. 11 is a flowchart showing a load monitoring process in the present embodiment.

FIG. 11 is a flowchart showing the load monitoring process in the present embodiment. At step S20, monitoring means measure the amounts of resources used by each tenant and the amounts of resources used in each network appliance 20. The monitoring means refers to the load monitoring block 26 (see FIG. 2B) in the network appliance 20 and/or the load monitoring block 16 (see FIG. 3B) in the switch 10. The monitoring means periodically notify the controller 100 of measurement information which indicates the measured used resource amounts.

Figure 12:
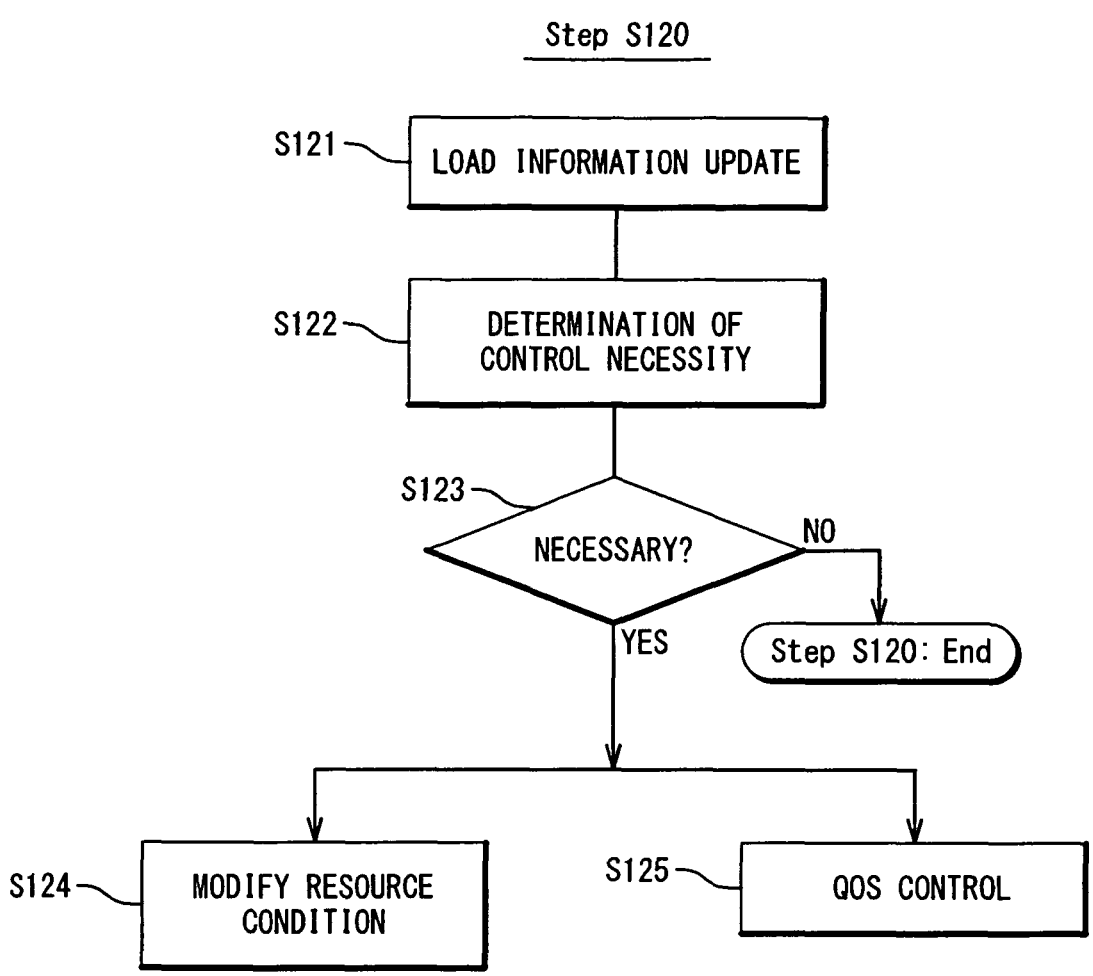
FIG. 12 is a flowchart showing a dynamic change process (i.e. step S120) in the present embodiment.

The controller 100 performs a dynamic control process (i.e. step S120). FIG. 12 is a flowchart showing step S120.

Step S121:

The information collection block 140 of the controller 100 collects the above measurement information from each of the monitoring means. The load management block 150 generates and updates the load information LAD by integrating measurement information obtained from all of the monitoring means. For example, the load management block 150 may calculate the amounts of the used resources (or process load) of the network appliance 20 by integrating the measurement information received from the switches 10 connected to a certain network appliance 20.

Step S122:

The assignment control block 110 of the controller 100 performs a dynamic control process, taking the load information LAD, which is stored in the storage unit 102, into consideration. More specifically, the assignment control block 110 initially determines whether or not a "control" is required. The "control" here includes a change in a resource condition of a tenant and QoS (Quality of Service) control in the switch 10.

For example, the assignment control block 110 refers to the load information LAD and the tenant information TNT and compares the amounts of the resources used by a tenant with a threshold. Here, the threshold is a parameter which is dependent on the resource condition of the relevant tenant indicated in the tenant information TNT, including, for example, the resource condition itself or X % (X=0 to 100) of the resource condition. When the amount of a resource used by a tenant reaches a threshold, the assignment control block 110 determines a certain "control" is necessary with respect to the tenant.

Also, for example, the assignment control block 110 may compare, by referring to the load information LAD and the appliance information APL, the amount of a resource used in the network appliance 20 with a resource capacity. If the ratio of the amount of the used resource relative to the resource capacity exceeds a predetermined threshold, the assignment control block 110 determines a certain "control" is necessary with respect to a tenant which is assigned to the network appliance 20.

Step S123:

When the "control" is determined as being unnecessary (step S123: No), step S120 is completed. In contrast, when the "control" is determined as being necessary (step S123; Yes), the assignment control block 110 changes the resource condition or determines execution of the QoS control. It is dependent on operation policies of the system whether one or both of the change of the resource condition and the QoS control should be carried out, and the operator may make an appropriate decision.

In the following, a description is given of a case in which a certain "control" is carried out for a first tenant, as an example. It is assumed that the first tenant is currently assigned to a first network appliance 20-1. The resource capacity of the first network appliance 20-1 is a first resource capacity. The resource condition of the first tenant is a first resource condition. The amount of the resource used by the first tenant is a first used resource amount. The traffic transfer amount is considered as the resource. For example, it is assumed that the first resource capacity is 1000 Mbps, the current first resource condition is 60.0 Mbps and the threshold is 600 Mbps which is the same as the first resource condition. When the first used resource amount indicated in the load information LAD reaches the threshold, the assignment control block 110 carries out the "control" for the first tenant.

Step S124:

Step S124 is related to a case of changing the resource condition. More specifically, the assignment control block 110 refers to the appliance information APL (see FIG. 6), the tenant information TNT (see FIG. 7) and the assignment information ASN (see FIG. 8) which are stored in the storage unit 102, and determines whether or not there is still room for the first resource capacity of the first network appliance 20-1.

When there is still room for the first resource capacity, the assignment control block 110 increases the first resource condition. Here, the assignment control block 110 determines a new first resource condition so that the "total sum of the resource conditions of the assigned tenants" does not exceed the "resource capacity". When there is a surplus of 200 Mbps for the first resource capacity, the assignment control block 110 changes the first resource condition from 600 Mbps to 800 Mbps. The assignment control block 110 further updates the first resource condition of the first tenant in the tenant information TNT.

If there is no room for the first resource capacity anymore, the assignment control block 110 considers a QoS control in the switches 10 (step S125).

Step S125:

The step S125 is related to a case in which a QoS control is performed in the switches 10. The assignment block 110 determines how to execute a QoS control and provides instructions to the switches 10 accordingly. The QoS control in the switches 10 is as follows: More specifically, the switch processing blocks 11 carry out the QoS control. For example, the switch processing blocks 11 carry out a bandwidth control to discard TCP packets of a specific flow in the traffic assigned to a tenant. Alternatively, the switch processing blocks 11 may carry out a priority control by referring to header fields of packets of a specific flow. It should be noted that the priority control may be carried out based on application layer information when the switch 10 can refer to the application layer information. For example, the priority control may be carried out based on the mail addresses of the transmission sources and the transmission destinations for an email system, and the priority control may be carried out based on SIP-URIs of the transmission sources and the transmission destinations for the SIP traffic.

3-3. Assignment Canceling Process

Figure 13:
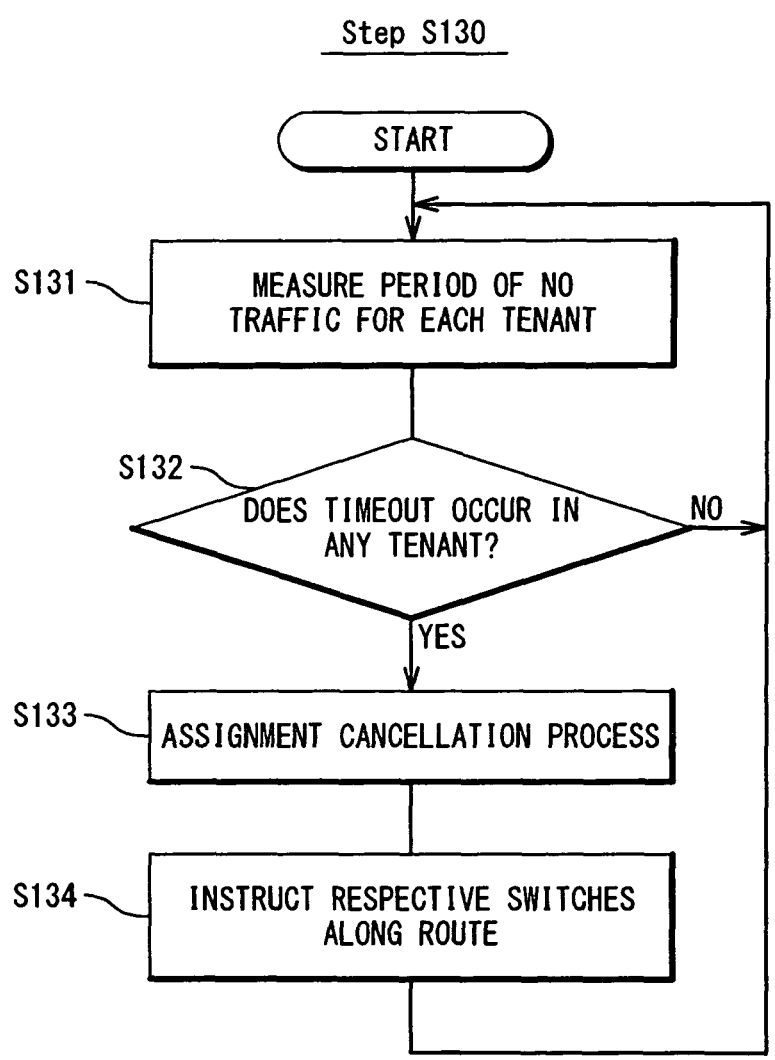
FIG. 13 is a flowchart showing an assignment canceling process (i.e. step S130) in the present embodiment.

FIG. 13 is a flowchart showing an assignment canceling process (i.e. step S130).

Step S131:

The assignment control block 110 of the controller 100 measures "no traffic period" for each tenant by using a built-in timer. The no traffic period means a period during which there is no flow in the traffic.

Step S132:

When no traffic period exceeds a predetermined threshold with respect to a certain tenant, that is, when a timeout occurs, the process jumps to step S133.

Step S133:

Let us consider a case in which, a timeout occurs regarding the above-mentioned first tenant, for example. In this case, the assignment control block 110 cancels the assignment of the first tenant to the first network appliance 20-1 and updates the assignment information ASN. Also, the assignment control block 110 sets the active flag of the first tenant to "not Active" in the tenant information TNT. The assignment control block 110 also deletes the entry of the first tenant from the tenant policy table 24 of the first network appliance 20-1.

Step S134:

The switch setting block 130 refers to the route design information RTE and instructs each of the switches 10 along the flow route of the first tenant to delete the entry regarding the first tenant from the flow table 14.

4. Advantageous Effects

As explained above, the controller 100 according to the present embodiment carries out a "dynamic assignment process". That is, the controller 100 determines the assignment relation between the tenants and the network appliances 20 and dynamically changes the relation depending on circumstances. In addition, the controller 100 controls each of the switches 10 so as to realize the assignment relation. That is, according to the present embodiment, the controller 100 dynamically controls the usage states of the network appliances 20 by controlling the switches 10, without causing the network appliances 20 to be conscious of the control. This allows sharing a resource of the network appliances 20 by a plurality of tenants, without causing each of the network appliances 20 to be conscious of the sharing.

As a comparative example, let us consider a case in which a resource of one network appliance 20 is divided and the divided resources are respectively assigned to a plurality of tenants in advance, by using the virtualization technique described in the above-described non-patent document entitled, "Cisco Application Control Engine: a Technical Overview of Virtual Partitioning". When one network appliance 20 has a traffic transfer performance of 1 Gbps, for example, a traffic transfer performance of 600 Mbps is assigned to a tenant A and that of 400 Mbps is assigned to another tenant B. Here, such a circumstance may occur that the traffic transfer amount of the tenant A reaches 600 Mbps while there is no traffic flow related to the tenant B. Even in this case, however, it is impossible to increase the resource assigned to the tenant A, owing to the predetermined assignment amount. That is, the resource of the network appliance 20 is not utilized effectively and wasted. When the number of tenants is increased, the amount of such waste is also increased.

In contrast, according to the present embodiment, the resources of each of the network appliances 20 can be utilized effectively, owing to the dynamic assignment process. In other words, it is possible to share the resources of each of the network appliances 20, efficiently. Furthermore, in the present embodiment, it is unnecessary for the network appliances 20 to support virtualization. Even if virtualization is not supported by a network appliance 20, it is possible to share the resources of the network appliance 20 by using the controller 100 and the switches 10.

As explained above, according to the present embodiment, the resources of each of the network appliances 20 can be shared efficiently by a plurality of tenants. This enables accommodating tenants with high efficiency and providing services for users at a reduced cost.

Although the embodiments of the present invention are explained above with reference to the attached, the present invention is not limited to the above embodiments and arbitrary changes may be made by the person skilled in the art within a range without departing from the gist thereof.

The present application claims priority based on Japanese patent application No. 2009-284019, filed on Dec. 15, 2009, the entire disclosure of which is incorporated herein by reference.

What is claimed is:

1. A network system, comprising:
a server which accommodates a plurality of tenants;
a plurality of network appliances which has a resource shared by said plurality of tenants;
a plurality of switches arranged between said network appliances and a network; and
a controller which controls said plurality of the switches,
wherein each of said plurality of the switches includes a flow table indicating an association of an input source and a transfer destination of packets for each flow, and transfers packets received from said input source to said transfer destination by referring to said flow table, and
wherein said controller includes:

an assignment control block which carries out a dynamic assignment process for dynamically assigning each of a plurality of tenants to any of said network appliances in response to used resource amounts of said network appliances, said used resource amounts including traffic transfer performances of said network appliances used by said plurality of tenants, the traffic transfer performances including rates of data transfer of said network appliances;

a route design block which designs a flow route for each of said tenants so as to pass through said assigned network appliance; and a switch setting block which sets said flow table for each of switches along said designed route so that packets which belong to a flow related to each of tenants is transferred along said designed route, wherein the plurality of tenants, which are accommodated in the server, provides services, wherein the network appliances each execute a specific process for network traffic which passes through the network appliances, and wherein the plurality of switches are arranged between the network appliances and an external network, and the plurality of switches are connected to the external network via a gateway.

2. The network system according to claim 1, wherein said controller further includes a storage unit storing therein appliance information, tenant information and assignment information, wherein said appliance information indicates a resource capacity of each of said network appliances, said resource capacity being a total amount of a resource of each of said network appliances, said resource including a traffic transfer performance, the traffic transfer performance including a rate of data transfer of each of said network appliances, wherein said tenant information indicates a resource condition of each of said plurality of tenants, said resource condition being an amount of resources of said network appliances, which are allowed to be used by one tenant, wherein said assignment information indicates an assignment relation between said plurality of tenants and said network appliances, and wherein said assignment control block refers to said appliance information, said tenant information and said assignment information and performs said dynamic assignment process so that a total sum of said resource conditions of tenants assigned to each of said network appliances does not exceed said resource capacity of each of said network appliances.

3. The network system according to claim 2, wherein said switch setting block refers to said tenant information and instructs each of said plurality of switches to control a traffic transfer amount of each of said plurality of tenants, so that the traffic transfer amount ranges within said resource condition.

4. The network system according to claim 2, wherein said storage unit further stores load information, wherein said load information indicates the used resource amounts of said network appliances, and wherein said assignment control block performs said dynamic assignment process by further referring to said load information.

5. The network system according to claim 4, wherein said network appliances include a first network appliance, wherein a first tenant of said plurality of tenants is assigned to said first network appliance, wherein said resource condition of said first tenant is defined as a first tenant condition, wherein one of said used resource amounts used by said first tenant is a first used resource amount, and wherein said assignment control block performs comparison of said first used resource amount with a threshold which depends on said first resource condition and performs said dynamic assignment process related to said first tenant in response to a result of said comparison.

6. The network system according to claim 5, wherein, when said first used resource amount reaches said threshold, said assignment control block determines whether or not there is room for said resource capacity of said first network appliance, wherein said assignment control block increases said first resource condition when there is the room for said resource capacity of said first network appliance.

7. The network system according to claim 5, wherein, when said first used resource amount reaches said threshold, said assignment control block determines whether or not there is room for said resource capacity of said first network appliance, wherein said plurality of switches perform a QoS control in accordance with instructions of said assignment control block, when there is no room for said resource capacity of said first network appliance.

8. The network system according to claim 4, further comprising: monitoring blocks which measure said used resource amounts and informs measurement information indicating said measured used resource amounts, wherein said controller further includes a load management block which updates said load information in response to said measurement information received from said monitoring blocks.

9. The network system according to claim 8, wherein said monitoring blocks are incorporated in said network appliances or in said plurality of switches.

10. The network system according to claim 1, wherein dynamic assignment of the resources of the network appliances, which each execute a specific process for the network traffic, is provided to the plurality of tenants accommodated in the server.

11. The network system according to claim 1, the network appliances are each an intervening device provided in the path of the network traffic.

12. The network system according to claim 1, wherein a client is connected to the external network.

13. The network system according to claim 1, wherein the flow table setting of switches by the switch setting block establishes a flow route for each of the plurality of tenants to provide dynamic switching of the assignment of the network appliances to the plurality of tenants in response to the used traffic transfer performances of the network appliances.

14. A controller to be used in a network system including:

a server which accommodates a plurality of tenants;

a plurality of network appliances which has a resource shared by said plurality of tenants; and a plurality of switches arranged between said at least one network appliance and a network, each of said plurality of the switches having a flow table indicating an association of an input source with a transfer destination of packets for each flow and transferring packets received from said input source to said transfer destination by referring to said flow table, said controller comprising:

an assignment control block carries out a dynamic assignment process for dynamically assigning each of a plurality of tenants to any of said network appliances in response to used resource amounts of said network appliances, said used resource amounts including traffic transfer performances of said network appliances used by said plurality of tenants, the traffic transfer performances including rates of data transfer of said network appliances;

a route design block which designs a flow route for each of said tenants so as to pass through said assigned network appliance; and a switch setting block which sets said flow table for each of switches along said designed route so that packets which belong to a flow related to each of tenants is transferred along said designed route, wherein the plurality of tenants, which are accommodated in the server, provides services, wherein the network appliances each execute a specific process for network traffic which passes through the network appliances, and wherein the plurality of switches are arranged between the network appliances and an external network, and the plurality of switches are connected to the external network via a gateway.

15. The controller according to claim 14, wherein dynamic assignment of the resources of the network appliances, which each execute a specific process for the network traffic, is provided to the plurality of tenants accommodated in the server.

16. A method of controlling a network system including:
a server which accommodates a plurality of tenants;
a plurality of network appliances which has a resource shared by said plurality of tenants; and
a plurality of switches arranged between said network appliances and a network,
each of said plurality of the switches having a flow table indicating an association of an input source with a transfer destination of packets for each flow and transferring packets received from said input source to said transfer destination by referring to said flow table,
said method comprising:
carrying out a dynamic assignment process for dynamically assigning each of a plurality of tenants to any of said network appliances in response to used resource amounts of said network appliances, said used resource amounts including traffic transfer performances of said network appliances used by said plurality of tenants, the traffic transfer performances including rates of data transfer of said network appliances;
designing a flow route for each of said tenants so as to pass through said assigned network appliance; and
setting said flow table for each of switches along said designed route so that packets which belong to a flow related to each of tenants is transferred along said designed route;
providing services, by the plurality of tenants, which are accommodated in the server, provides services; and
executing, by each of the network appliances a specific process for network traffic which passes through the each of the network appliances,
wherein the plurality of switches are arranged between the network appliances and an external network, and the plurality of switches are connected to the external network via a gateway.

17. The method according to claim 16, wherein dynamic assignment of the resources of the network appliances, which each execute a specific process for the network traffic, is provided to the plurality of tenants accommodated in the server.

18. The method according to claim 16, wherein said setting of said flow table for each of the switches establishes a flow route for each of the plurality of tenants to provide dynamic switching of the assignment of network appliances to the plurality of tenants in response to the used traffic transfer performances of the network appliances.

19. A non-transitory recording medium which records a control program which when executed causes a computer to perform a control process of a network system including:
a server which accommodates a plurality of tenants;
a plurality of network appliances which has a resource shared by said plurality of tenants; and
a plurality of switches arranged between said network appliances and a network,
each of said plurality of the switches having a flow table indicating an association of an input source with a transfer destination of packets for each flow and transferring packets received from said input source to said transfer destination by referring to said flow table,
said control process including:
carrying out a dynamic assignment process for dynamically assigning each of a plurality of tenants to any of said network appliances in response to used resource amounts of said network appliances, said used resource amounts including traffic transfer performances of said network appliances used by said plurality of tenants, the traffic transfer performances including rates of data transfer of said network appliances;
designing a flow route for each of said tenants so as to pass through said assigned network appliance; and
setting said flow table for each of switches along said designed route so that packets which belong to a flow related to each of tenants is transferred along said designed route;
providing services, by the plurality of tenants, which are accommodated in the server, provides services; and
executing, by each of the network appliances a specific process for network traffic which passes through the each of the network appliances,
wherein the plurality of switches are arranged between the network appliances and an external network, and the plurality of switches are connected to the external network via a gateway.

20. The non-transitory recording medium according to claim 19, wherein dynamic assignment of the resources of the network appliances, which each execute a specific process for the network traffic, is provided to the plurality of tenants accommodated in the server.

* * * * *